US011227127B2

(12) United States Patent
Kumar et al.

(10) Patent No.: US 11,227,127 B2
(45) Date of Patent: Jan. 18, 2022

(54) NATURAL LANGUAGE ARTIFICIAL INTELLIGENCE TOPOLOGY MAPPING FOR CHATBOT COMMUNICATION FLOW

(71) Applicant: International Business Machine Corporation, Armonk, NY (US)

(72) Inventors: Balaji Sankar Kumar, Bangalore (IN); Vishal George Palliyathu, Bangalore (IN); John Kurian, Bangalore (IN); Ranjith E. Raman, Bangalore (IN); Michael J. Iantosca, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/580,792

(22) Filed: Sep. 24, 2019

(65) Prior Publication Data
US 2021/0089627 A1    Mar. 25, 2021

(51) Int. Cl.
| | | |
|---|---|---|
| *G06F 40/14* | (2020.01) | |
| *G06F 40/279* | (2020.01) | |
| *G06F 40/35* | (2020.01) | |
| *G06F 40/56* | (2020.01) | |
| *H04L 12/58* | (2006.01) | |
| *G06F 40/30* | (2020.01) | |
| *G06F 40/284* | (2020.01) | |

(52) U.S. Cl.
CPC ............ *G06F 40/56* (2020.01); *G06F 40/284* (2020.01); *G06F 40/30* (2020.01); *H04L 51/02* (2013.01)

(58) Field of Classification Search
CPC ........ G06F 40/10; G06F 40/117; G06F 40/14; G06F 40/154; G06F 40/205; G06F 40/30; G06F 40/35; G06F 40/279; G06F 40/284; H04L 51/02
USPC ............................... 704/1, 9, 10; 706/12, 55
See application file for complete search history.

(56) References Cited

U.S. PATENT DOCUMENTS

| | | | |
|---|---|---|---|
| 8,255,888 B2 | 8/2012 | Jesse et al. | |
| 8,676,722 B2 | 3/2014 | Sweeney et al. | |
| 9,659,005 B2 | 5/2017 | Ramish | |
| 10,592,538 B2* | 3/2020 | George | G06F 40/279 |
| 10,592,610 B1* | 3/2020 | Shen | G06F 40/35 |
| 10,832,008 B2* | 11/2020 | Banerjee | G06F 40/205 |
| 2006/0253275 A1* | 11/2006 | Parkinson | G06F 40/211 |
| | | | 704/9 |
| 2007/0203693 A1 | 8/2007 | Estes | |

(Continued)

*Primary Examiner* — Martin Lerner
(74) *Attorney, Agent, or Firm* — Lieberman & Brandsdorfer, LLC

(57) ABSTRACT

Embodiments relate to an intelligent computer platform to support a chatbot platform. A semantically enriched document is subjected to natural language processing to generate a cache of tokens, and further classify the tokens, including noun and verb tokens. For each verb token, a corresponding intent is generated, and for each noun token a corresponding entity is generated. A relationship between the generated intents and entities is mapped, and a topology representing the mapped relationship is constructed. A primary verb is identified and assigned as a root node in the topology, and an arrangement of entities related to primary verb are identified and assigned as child nodes related to the root node. The constructed topology is consumed to an AI schema for implementation in the chatbot platform to support real-time communication flow.

15 Claims, 12 Drawing Sheets

(56) References Cited

U.S. PATENT DOCUMENTS

| | | | |
|---|---|---|---|
| 2010/0241420 A1* | 9/2010 | Walker | G06F 40/35 |
| | | | 704/9 |
| 2013/0211823 A1 | 8/2013 | Ceusters et al. | |
| 2014/0303963 A1 | 10/2014 | Womack et al. | |
| 2016/0259851 A1* | 9/2016 | Hopkins | G06F 40/211 |
| 2017/0091207 A1* | 3/2017 | Kumar | G06F 16/2228 |
| 2017/0255477 A1* | 9/2017 | Malatesha | G06F 9/453 |
| 2017/0308521 A1* | 10/2017 | Bruno | G06F 40/205 |
| 2017/0351755 A1* | 12/2017 | Kumar | G06F 16/367 |
| 2018/0233133 A1* | 8/2018 | Hilal | G06F 40/20 |
| 2018/0365026 A1* | 12/2018 | Jernigan | G06N 20/00 |
| 2019/0147044 A1* | 5/2019 | Bangalore | G06F 40/30 |
| | | | 704/257 |
| 2019/0294678 A1* | 9/2019 | Sapugay | G06F 40/30 |
| 2020/0005117 A1* | 1/2020 | Yuan | G06F 40/30 |
| 2020/0125901 A1* | 4/2020 | Pelov | G06F 16/3329 |

* cited by examiner

NATURAL LANGUAGE ARTIFICIAL INTELLIGENCE TOPOLOGY MAPPING FOR CHATBOT COMMUNICATION FLOW

BACKGROUND

The present embodiments relate to an artificial intelligence platform and machine learning for dynamic generation of an AI schema. More specifically, the embodiments relate to leveraging the generated AI schema representing a conversation flow for use in a chatbot platform.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

SUMMARY

The embodiments include a system, computer program product, and method to support a chatbot platform.

In one aspect, a computer system is provided with a processing unit and memory for use with an artificial intelligence (AI) computer platform to support an associated chatbot platform. The processing unit is operatively coupled to the memory and is in communication with the AI platform. As shown and described, the AI platform includes tools in the form of a natural language (NL) manager, a relationship manager, and a topology manager. The NL manager subjects semantically enriched document to natural language processing (NLP) and generates a cache of identified tokens. The NL manager classifies the tokens in the cache, which includes classification of noun and verb tokens. For each verb token, the NL manager generates an intent corresponding to the verb token, and for each noun token, the NL manager generates an entity corresponding to the noun token. The relationship manager maps a relationship between the generated intents and entities. The topology manager constructs a topology representing the mapped relationship. The functionality of the topology manager further includes identification of a primary verb and assignment of the primary verb as a root node in the topology. Similarly, the topology manager identifies an arrangement of entities related to primary verb and assigns the arrangement as child nodes related to the root node. The processing unit consumes the constructed topology to an AI schema for implementation in the chatbot platform to support real-time communication flow.

In another aspect, a computer program device is provided with a computer readable storage medium and embodied program code executable by a processor and configured to support a chatbot platform. Program code is provided to subject semantically enriched document to natural language processing (NLP) and generate a cache of identified tokens, and classify noun and verb tokens within the cache of identified tokens. For each identified verb token, program code is provided to generate an intent corresponding to the verb token(s) and generate an entity corresponding to the noun token(s). Program code is provided to map a relationship between the generated intents and entities. Program code is further provided to construct a topology representing the mapped relationship. The topology mapping includes program code to: identify a primary verb, assign the identified primary verb as a root node in the topology, and identify an arrangement of entities related to primary verb and assign the arrangement as child nodes related to the root node. Program code is provided to consume the constructed topology to an AI schema for implementation in the chatbot platform to support real-time communication flow.

In yet another aspect, a method is provided to support a chatbot platform. A semantically enriched document is subjected to natural language processing (NLP), and a cache of identified tokens is generated. The identified tokens are subject to classification, including classifying noun tokens and verb tokens in the cache. For each verb token, an intent corresponding to the verb token(s) is generated, and for each noun token an entity corresponding to the noun token(s) is generated. A relationship between the generated intents and entities is mapped, and a topology representing the mapped relationship is constructed. With respect to construction of the topology, a primary verb is identified and assigned as a root node in the topology, and an arrangement of entities related to primary verb are identified and assigned as child nodes related to the root node. The constructed topology is consumed to an AI schema for implementation in the chatbot platform to support real-time communication flow.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
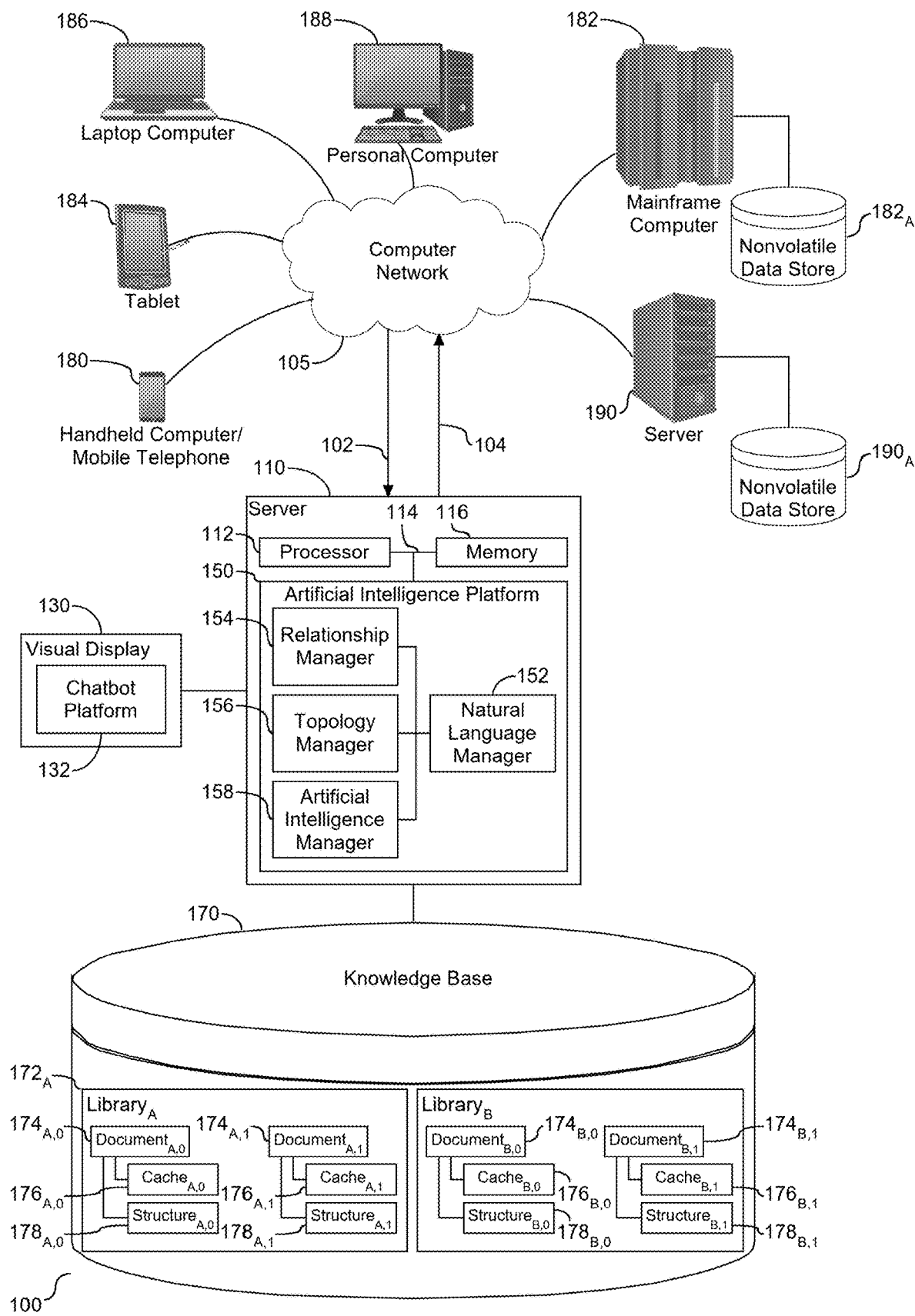
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Recent advancements in artificial intelligence (AI) and associated technology is found with businesses moving from traditional to digital platforms for transactions. A growing area of AI pertains to computer simulation conversation. A chatbot, also referred to herein as an artificial conversational entity, is employed in an electronic environment and mapped to logically arranged data. The chatbot utilizes guidelines and machine learning (ML), and is limited in its scope of conversation in that it can only respond to a set quantity of requests and vocabulary, and is only as intelligent as its programming code. The chatbot utilizes an AI neural network, and is programmed to self-learn as it is introduced to new dialogues and words.

It is understood in the art that a cognitive platform learns by the intents and entities upon which it is trained. An intent represents a purpose or a task of a corresponding input. In one embodiment, the intent is an action to be performed with a corresponding application. Intents are identified by verbs. An entity represents a class of an object or data types that is relevant to the purpose. More specifically, the entity represents the object, product, or feature on which the task is to be performed. Entities are identified by nouns. A pivotal challenge in the chatbot is directed at training an AI system with intents, entities, and dialogs. Identification, classification, and generation of such primary building blocks is a time consuming and resource intensive process, which in one embodiment also requires frequent revisions and tweaking.

Darwin Information Typing Architecture (DITA) is an industry standard for technical communication and can be utilized in diverse domain applications for standalone documents, online information centers, embedded assistance, or customized run time generation of help systems. DITA is an authoring paradigm that provides a framework to create, construct, and deliver complex technical information sets. As shown and described herein, semantically enriched information sets, such as, but not limited to, DITA, are leveraged to create an AI schema for implementation in an artificial intelligence (AI) conversational entity, also referred to herein as a chatbot or bot. A pivotal challenge in such bots is directed at training an AI system with primary building blocks in the form of intents, entities and dialogs. The identification, classification, and generation of these primary building blocks are time consuming and intensive.

As shown and described herein, semantically enriched information sets, such as DITA, are subject to tokenization into basic components. Using the tokenization, a cache of verbs, gerunds, and nouns is created, and groupings of topics within the documents are created using the cache. Intents and entities are generated from the gerunds and nouns. In one embodiment, nouns are grouped in a hierarchy, with at least two layers, including a parent layer directed at a primary noun and a child or children layer directed at secondary nouns. A hierarchy is understood in the art as an inverted tree structure in which a plurality of items is grouped in the layering. Dialog nodes are generated from the groupings of gerunds versus noun parents and noun children, and an AI schema is generated from the dialog nodes. The schema is leveraged to generate replies to received communications in a chatbot environment.

Each intent represents a purpose of corresponding input. More specifically, the intent is an action or task to be performed. The intent is referred to herein as a gerund, which is known in the art as a verbal noun that expresses a generalized or uncompleted action. More specifically, the gerund is derived from a verb but functions as a noun, e.g. ending in -ing. For example, a gerund for the verb "install" is "installing". An entity represents a class of objects or a data type that is relevant to the represented purpose; the entity represents an object, product, or feature on which the task is performed. In one embodiment, the entity is a noun.

As shown and described herein, intents and entities are extrapolated from semantically enriched information sets, such as DITA, that have well defined content classifiers and a table of contents (toc).

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including natural language processing (NLP) and ML, across the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to enable supervised learning. The tools function to identify multi-lingual action tokens to support a chatbot platform using AI, NLP, and ML techniques. The tools include, but are not limited to, a natural language (NL) manager (152), a relationship manager (154), a topology manager (156), and an AI manager (158). The AI platform (150) may receive input across the network (105) and leverage a data source (170), also referred to herein as a corpus or knowledge base, to selectively access documents and corresponding topological structures. As shown the data source (170) is configured with one or more libraries. In one embodiment, the library may be distributed across the network (105). Accordingly, the AI platform (150) and the corresponding tools (152)-(158) are operatively coupled to the knowledge base (170) and the corresponding one or more libraries.

As shown herein, the knowledge base (170), also referred to as a data source, is configured with libraries populated with logically grouped or categorized documents. In the example shown herein, the knowledge base (170) is shown with two libraries, including library$_A$ (172$_A$) and library$_B$ (172$_B$). Although there are only two libraries shown, this quantity is for illustrative purposes and should not be considered limiting. In one embodiment, each library is populated with one or more documents, with the populated document corresponding to categorization of the associated library. As shown herein, library$_A$ (172$_A$) is shown with two documents, shown herein as document$_{A,0}$ (174$_{A,0}$) and document$_{A,1}$ (174$_{A,1}$), and library$_B$ (172$_B$) is shown with two documents, shown herein as document$_{B,0}$ (174$_{B,0}$) and document$_{B,1}$ (174$_{B,1}$). Although each library is shown with two documents, this quantity is for illustrative purposes and should not be considered limiting. The library documents are provided in the form of semantically enriched documents, such as a DITA enriched document. In one embodiment, the documents are subject to enrichment or an enrichment process to translate a non-semantically enriched document to an enrichment format. Accordingly, the knowledge base (170) is populated with document libraries of semantically enrichment documents.

The library documents are subject to NLP. As shown herein, the NL manager (152) functions to subject one or more of the library documents to NLP to subject the document to tokenization, from which document tokens are generated. Tokenization is an act of breaking up a sequence of strings into pieces, such as words, keywords, phrases, symbols, and other elements called tokens. In one embodiment, the tokens can be individual words, phrases, or a sentence. In one embodiment, characters in the form of punctuation marks are discarded in the tokenization process. As shown herein by way of example, document$_{A,0}$ (174$_{A,0}$) has a corresponding cache of token, cache$_{A,0}$ (176$_{A,0}$). The tokens are subject to further processing for classification. The NL manager (152) classifies the tokens representing nouns as noun tokens and classifies the tokens representing verbs as verb tokens. Using the classification, the NL manager (152) generates an intent for each verb token and generates an entity corresponding to each noun token. The intent represents the purpose of the corresponding input, e.g. a task to be performed. In one embodiment, the intent is a gerund. The entity represents a class of an object or data type that is relevant to a corresponding purpose; the entity represents the object, product, or feature upon which the task is to be performed. Entities are nouns. In one embodiment, the NL manager groups verb tokens based on similarity, e.g. groups different forms of the same verb. For each group of verb tokens, the NL manager identifies a primary verb as a representative verb of the group and generates a primary intent corresponding to the primary verb. In one embodiment, the NL manager (152) leverages the TOC, or in one embodiment a DITAMAP, to identify a primary verb, primary noun, secondary noun, etc. Accordingly, the NL manager (152) is responsible for tokenization of the documents and identification of intents and entities represented in the documents.

The relationship manager (154) is shown herein operatively coupled to the NL manager (152). The relationship manager (154) leverages the intents and entities identified by the NL manager (152) to map a relationship between the generated intents and entities. In one embodiment, the TOC or DITAMAP is leveraged to identify the relationship(s), and the relationship manager (154) functions to map the identified relationship. As shown and described herein, the identified relationship(s), intents, and entities are employed to generate a dialog.

The topology manager (156) is shown herein operatively coupled to the relationship manager (154). The topology manager (156) functions to construct a topology, also referred to herein as a topological structure, representing the mapped relationship. The topology manager (156) leverages the identified primary verb and assigns the primary verb to a root node of the topology. Using the mapped relationship(s), the topology manager (156) identifies an arrangement of entities related to the primary verb, and assigns the arrangement of entities as child nodes related to the root node. An example topology is shown and described in FIG. 11. The topology created and populated by the topology manager (156) arranges the primary verb and arrangement of entities into a hierarchy, which is understood in the art as an inverted tree structure in which a plurality of items is grouped in a layering. In one embodiment, the hierarchy includes a plurality of tiers, with each tier representing a layer. For example, in one embodiment, the root node represents a first layer and the entities populate a second layer. Accordingly, the created and populated topology includes a hierarchy of nodes of verbs and entities.

Figure 4:
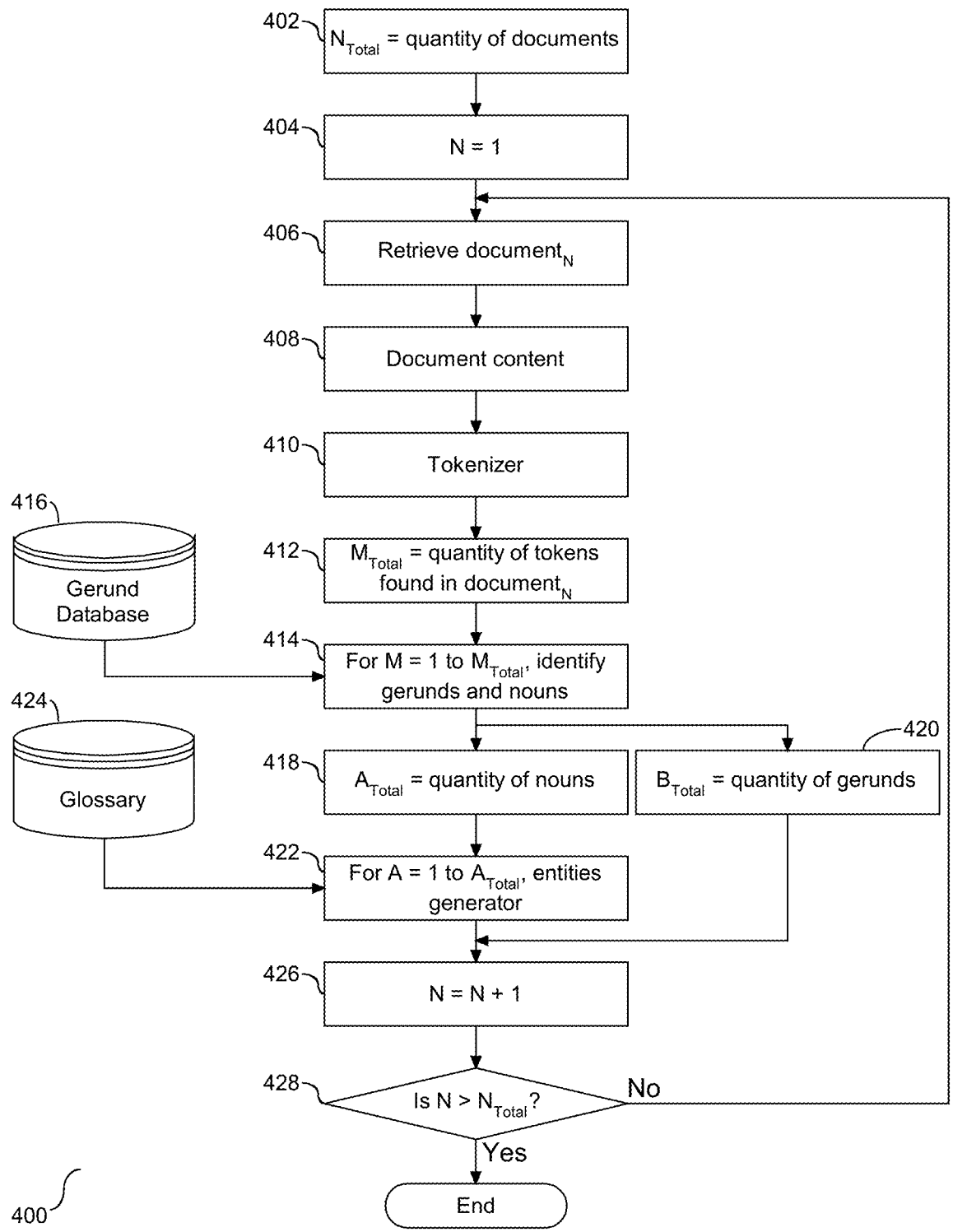
FIG. 4 depicts a flow chart illustrating a process for generating entities in a specified or identified document.

The act of noun identification includes, but is not limited to, identification of two or more nouns related to a common gerund, as shown and described in FIG. 4. The topology manager (156) interfaces with the NL manager (152) and the relationship manager (154) to reflect and document the identified nouns and their relationship to a primary node set at the root node in the hierarchy. The topology manager (156) establishes the hierarchical arrangement of the identified nouns, and designates a primary noun as a parent node in the topology and further designates a secondary noun as a child node in the topology. Accordingly, the topology manager (156) configures a hierarchy of verbs and related nouns into a hierarchical arrangement.

Figure 11:
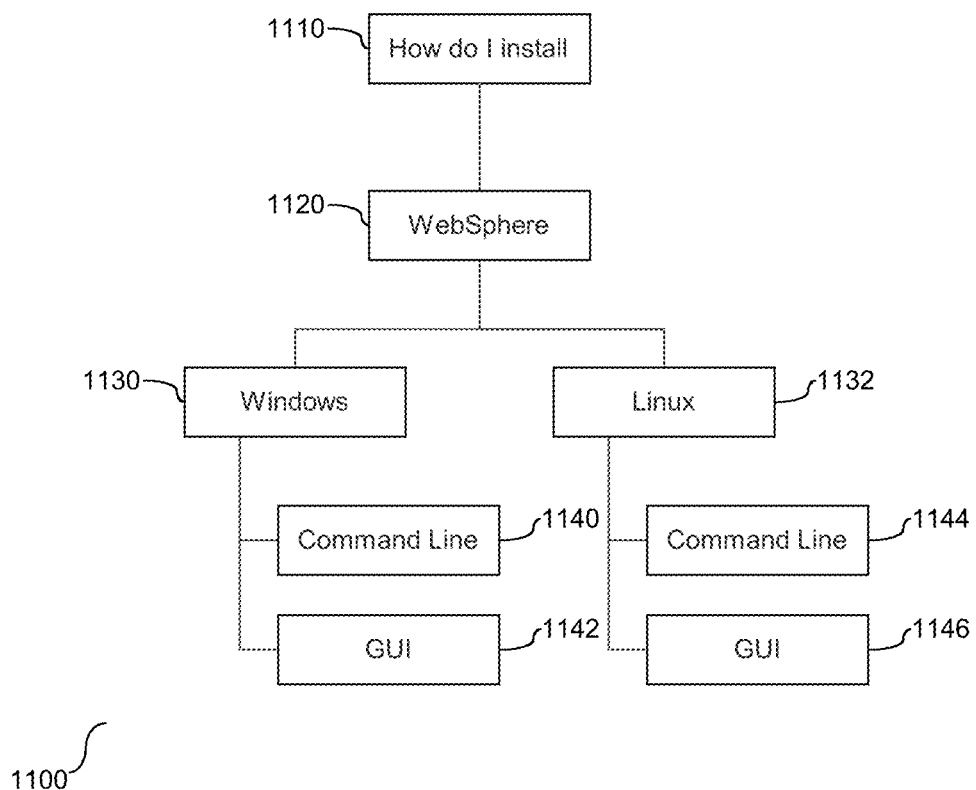
FIG. 11 depicts a block diagram illustrating an example dialog in a hierarchical tree structure arrangement.

The topology, e.g. hierarchical structure shown and described in FIG. 11, is constructed to support a series of communications, also referred to herein as a dialog. Referring to the knowledge base (170), a constructed topology is shown operatively coupled to each document. For example, document$_{A,0}$ (174$_{A,0}$) is shown with a corresponding topology structure$_{A,0}$ (178$_{A,0}$), document$_{A,1}$ (174$_{A,1}$) is shown with a corresponding topology structure$_{A,1}$ (178$_{A,1}$), document$_{B,0}$ (174$_{B,0}$) is shown with a corresponding topology structure$_{B,0}$ (178$_{B,0}$), and document$_{B,1}$ (174$_{B,1}$) is shown with a corresponding topology structure$_{B,1}$ (178$_{B,1}$). The hierarchical relationships demonstrated in the topology structures represent branches of communications to support a dialog, as pertaining to a specific document.

As shown herein, the knowledge base (170) is populated with a plurality of documents. Each document is placed into a corresponding library, such as library$_A$ (172$_A$) or library$_B$ (172$_B$), as shown herein. In one embodiment, each library has a subject and each document has a topic, and the documents are placed in an appropriate library based on the document topic matching or relating to the subject of the library. Documents organized into the same library may share content. In one embodiment, the shared content may be over-lapping or non-over-lapping. The relationship manager (154) includes functionality to merge, or in one embodiment join, select documents. More specifically, the relationship manager (154) identifies shared content between at least two documents, for example document$_{A,0}$ (174$_{A,0}$) and document$_{A,1}$ (174$_{A,1}$), and merges the corresponding structures, e.g. structure$_{A,0}$ (178$_{A,0}$) and structure$_{A,1}$ (178$_{A,1}$). The merge of the structures entails the NL manager (152) to identify similarity of the primary verb of the first document, e.g. document$_{A,0}$ (174$_{A,0}$), with a primary verb of the second document, e.g. document$_{A,1}$ (174$_{A,1}$), and the relationship manager (154) combining the primary verbs of the first and second documents into the root node. The topology manager (156) re-generates the structure with the combined primary verbs. The re-generation of the structure includes the topology manager (156) to designate a primary noun of the second document, e.g. document$_{A,1}$ (174$_{A,1}$), as a second parent node in the combined topology, and to designate a second secondary noun in the second document as a second child node in the combined topology. Accordingly, two or more documents may be merged, with the merge reflected in a re-generated combined topological structure.

The AI manager (158), which is shown herein operatively coupled to the topology manager (156), is configured to leverage one or more of the constructed structures in a chatbot platform to facilitate communications, which in one embodiment is a virtual conversation. The AI manager (158) is configured to detect deployment of a chatbot platform and a communication topic from an inquiry presented in the deployed chatbot. As shown herein, a visual display (130) is operatively coupled to the server (110) with a supporting chatbot platform (132). In one embodiment, the visual display (130) and chatbot platform (132) may be local to one or more of the computing devices operatively coupled to the server (110) across the network (105). The AI manager (158) selects a structure from the knowledge base (170) commensurate with the current communication topic detected in the chatbot platform. In one embodiment, the selected structure may be a re-generated structure created from a merge of two or more structures. The processing unit (112) consumes the selected structure to an AI schema for use and implementation in the chatbot platform to support real-time communication flow. In one embodiment, the processing unit (112) converts the selected structure to a structured object notation, e.g. javscript object notation (JSON) format, and the AI manager (158) employs the JSON format of the selected structure in the chatbot platform (132). The AI manager (158) selects the structure based on detection of a topic in the chatbot platform (132), and through the corresponding schema, the AI manager (158) generates and deploys a communication in the chatbot platform (132) corresponding to the detected communication topic. It is understood in the art that the chatbot platform (132) supports a series of communications. The AI manager (158) leverages context represented in the schema to generate one or more reply communications in the chatbot platform (132) to support and enable the series of communications. Accordingly, the AI manager (158) interfaces with the knowledge base (170) and the chatbot platform (132) to support and maintain a series of communications.

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (170) is configured with one or more libraries, shown herein as library$_A$ (172$_A$) and library$_B$ (172$_B$), for use by the AI platform (150). In one embodiment, the knowledge base (170) may be configured with other or additional sources of input, and as such, the sources of input shown and described herein should not be considered limiting. The various computing devices (180)-(190) in communication with the network (105) may include access points for the logically grouped documents in the corresponding one or more libraries of the knowledge base (170).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150), via a network connection or an internet connection to the network (105), is configured to detect and manage network activity and task data as related to travel and travel scheduling. The AI platform (150) may effectively orchestrate or optimize an orchestrated sequence of actions directed at related activity data by leveraging the knowledge base (170), which in one embodiment may be operatively coupled to the server (110) across the network (105).

The AI platform (150) and the associated tools (152)-(158) leverage the knowledge base (170) and one or more libraries, such as library$_A$ (172$_A$) and library$_B$ (172$_B$), to support communication in the chatbot platform (132). The AI manager (158) leverages the structures representing the documents in the knowledge base (170) to facilitate and enable communications, including reply communications, in the chatbot platform (132). More specifically, content supporting the communication(s) in the chatbot platform (132) stem from one or more of the nouns represented in the corresponding structure(s). Accordingly, the tools (152)-(158) facilitate and enable communication(s) in the chatbot platform (132), with the communication(s) including content represented in the corresponding structure leveraged to support the communication(s).

Documents and communications, e.g. electronic mail and messages, received across the network (105) may be processed by a server (110), for example IBM Watson® server, and the corresponding AI platform (150). As shown herein, the AI platform (150) together with the embedded tools (152)-(158) structurally represent documents used to support communication content in the chatbot platform (132). Accordingly, the AI platform (150) creates and utilizes a structural representation of document content to support and enable communication and communication content in the chatbot platform (132).

In some illustrative embodiments, the server (110) may be the IBM Watson® system available from International Business Machines Corporation of Armonk, N.Y., which is augmented with the mechanisms of the illustrative embodiments described hereafter. The tools (152)-(158), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to create and utilize a structural representation of document content to support and enable communication and communication content in the chatbot platform (132).

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store (190$_A$), and mainframe computer (182) utilizes nonvolatile data store (182$_A$). The nonvolatile data store (182$_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
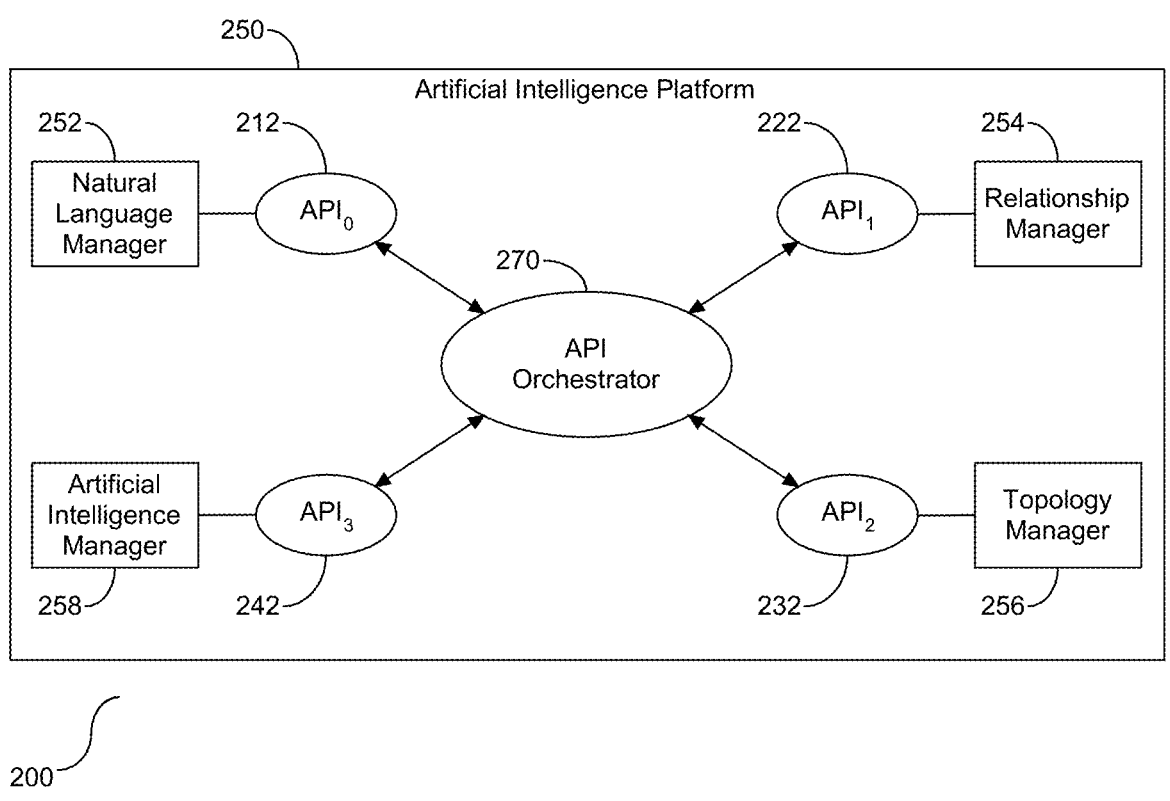
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(158), shown herein as tools (252)-(258), and their associated functionality. Referring to FIG. 2, a block diagram (200) is provided illustrating the tools (252)-(258) and their associated APIs. As shown, a plurality of tools is embedded within the AI platform (250), with the tools including the NL manager (152) shown herein as (252) associated with API$_0$ (212), the relationship manager (154) shown herein as (254) associated with API$_1$ (222), the topology manager (156) shown herein as (256) associated with API$_2$ (232), and the AI manager (158) shown herein as (258) associated with API$_3$ (242).

Each of the APIs may be implemented in one or more languages and interface specifications. API$_0$ (212) provides functional support to corresponding to NLP, including document token generation, verb and noun identification, and corresponding intent and entity generation; API$_1$ (222) provides functional support to map a relationship between the generated intent(s) and entities, including facilitating document merges; API$_2$ (232) provides functional support to map a relationship between identified document characteristic data and values in a new document, and API$_3$ (242) provides functional support to construct topological structures representing the mapped relationships for use by the processing unit for consumption into a corresponding AI schema for implementation in the chatbot platform. As shown, each of the APIs (212), (222), (232), and (242) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
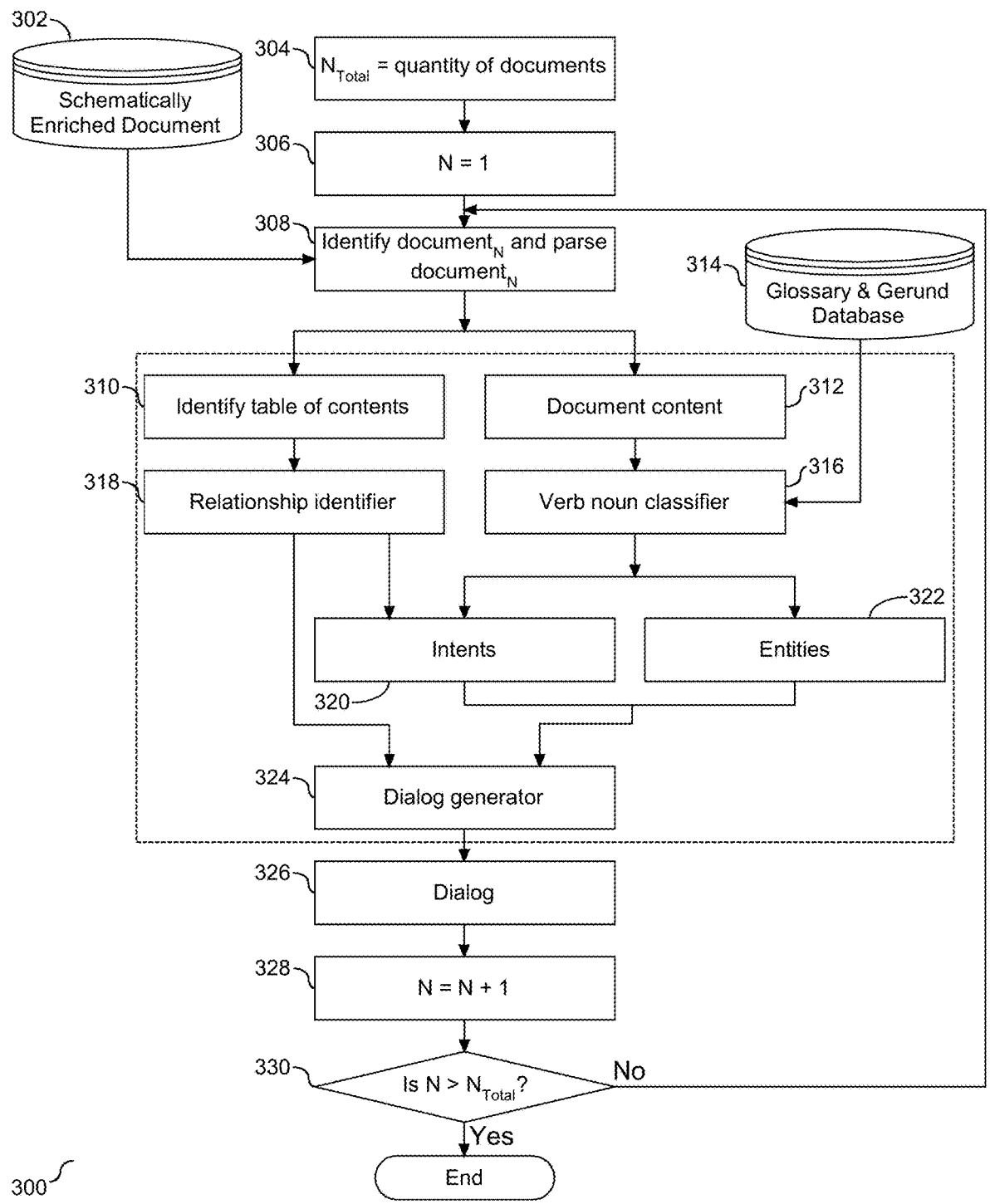
FIG. 3 depicts a flow chart illustrating a process for generating a dialog schema and leveraging the schema to support operation of a chatbot.

Referring to FIG. 3, a flow chart (300) is provided to illustrate a process for generating a dialog schema and leveraging the schema to support operation of a chatbot. As shown a repository of schematically enriched documents is operatively coupled to the process (302). The variable N$_{Total}$ is assigned to represent a quantity of documents in the repository or documents subject to processing (304), and a corresponding document counting variable, N, is initialized (306). Document$_N$ is identified or retrieved from the repository and is subject to parsing (308), which includes analyzing a document table of contents (TOC) and document content. Details of the document parsing are shown and described in FIG. 4. The TOC is identified for document$_N$ (310) and document content is identified (312). In one embodiment, and as shown herein, the identification at steps (310) and (312) take place in parallel. Using a glossary and gerund database (314), gerunds and nouns in the document are classified (316). Details of the classification process are shown and described in FIG. 4. Similarly, relationships in the form of intents are identified using the TOC (318). In one embodiment, and as shown herein, the classification at step (316) and the identification at step (318) take place in parallel. Details of the intent identification process are shown and described in FIGS. 4 and 5. Accordingly, intents are identified using the TOC and from the relationship identification (320), and entities are output from the verb and noun classification (322).

The identified relationships, intents, and entities are employed to generate a dialog (324). Details of the dialog generation process are shown and described in FIG. 9. Dialog in the form of a dialog schema is created as output for document$_N$ (326). Following step (326), the document counting variable N is incremented (328), and it is determined if each of the documents in the document repository have been process for creation of a dialog schema (330). A negative response to the determination at step (330) is followed by a return to step (308), and a positive response concludes the dialog schema creation process for a specified document. In one embodiment, the process shown and described herein may be activated following receipt of a document in the repository. Accordingly, as shown and described herein documents are subject to processing to generate a corresponding dialog schema.

As briefly shown in FIG. 3, one or more entities are generated or identified in a document subject to AI schema processing. Referring to FIG. 4, a flow chart (400) is provided to illustrate a process for generating entities in a specified or identified document. Similar to FIG. 3, the variable N$_{Total}$ is assigned to represent a quantity of documents in the repository or documents subject to processing (402), and a corresponding document counting variable, N, is initialized (404). A corresponding document, e.g. document$_N$, is identified or retrieved from the repository (406). Document content for document$_N$ is identified (408) and subject to tokenization (410) in which the document content is converted into tokens. Tokenization is an act of breaking up a sequence of strings into pieces, such as words, keywords, phrases, symbols, and other elements called tokens. In one embodiment, the tokens can be individual words, phrases, or a sentence. In one embodiment, characters in the form of punctuation marks are discarded in the tokenization process. As shown and described herein, the tokens are then subject to further processing for entity identification and AI dialog schema generation. Accordingly, each document in the repository is subject to a tokenization process to identify and represent document content in the form of tokens.

The variable M$_{Total}$ is assigned to represent the quantity of tokens formed from document$_N$ during the tokenization process (412). For each of the tokens, e.g. token$_M$, in the document, gerunds and nouns are identified (414). As shown herein, a gerund database (416) is leveraged to facilitate identification of the gerunds. The identified nouns are assigned to the variable A$_{Total}$(418), and the identified gerunds are assigned to the variable B$_{Total}$(420). For each identified noun, e.g. from A=1 to A$_{Total}$, entities are generated or otherwise identified (422). In one embodiment, and as shown herein, a glossary is consulted or leveraged (424) to generate or identify entities. It is understood that an identified gerund may have one or more associated nouns. In the case of a single noun associated with the identified gerund, the noun is referred to as a primary or parent noun. However, in the case of two nouns associated with the identified gerund, one noun is referred to and identified as the primary or parent noun, and the other noun(s) is referred to as a secondary or child noun. In the case of three nouns, two of the nouns are identified as the primary and secondary nouns, respectively, and the third noun is identified as a tertiary or grandchild noun. In one embodiment, the classification of the noun is based on its proximity to a corresponding gerund, e.g. the noun(s)'s physical and proximal position relative to the gerund is identified as the primary noun, the noun proximal to the primary noun is identified as the secondary noun, etc. Accordingly, a hierarchical arrangement of nouns is identified.

Following step (420) or step (422), the document counting variable is incremented (426), followed by an assessment to determine if each of the documents in the document repository has been subject to tokenization and noun and gerund identification (428). A negative response to the assessment is followed by a return to step (406), and a positive response concludes the tokenization process described herein. Accordingly, each document is subject to tokenization from which nouns and gerunds are identified.

Figure 5:
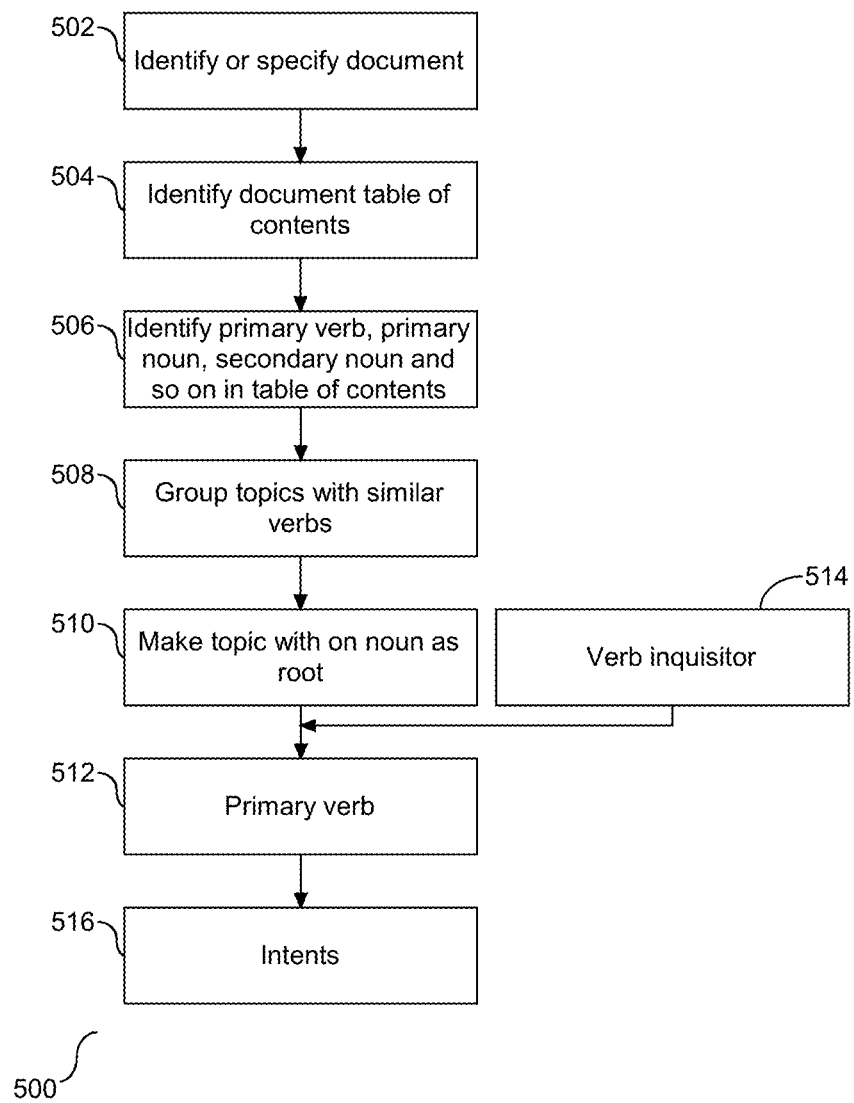
FIG. 5 depicts a flow chart illustrating a process for intent identification utilizing a table of contents for a specified document.
Figure 6:
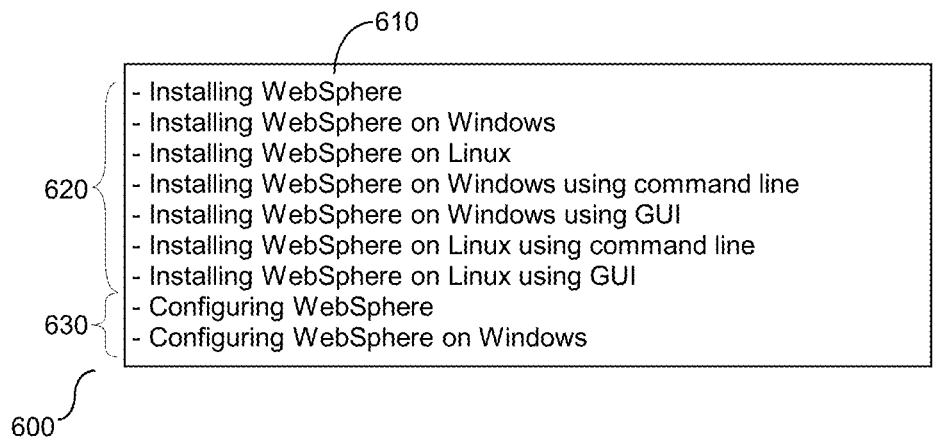
FIG. 6 depicts a block diagram illustrating an example table of contents (TOC) with tokenization of gerunds.
Figure 7:
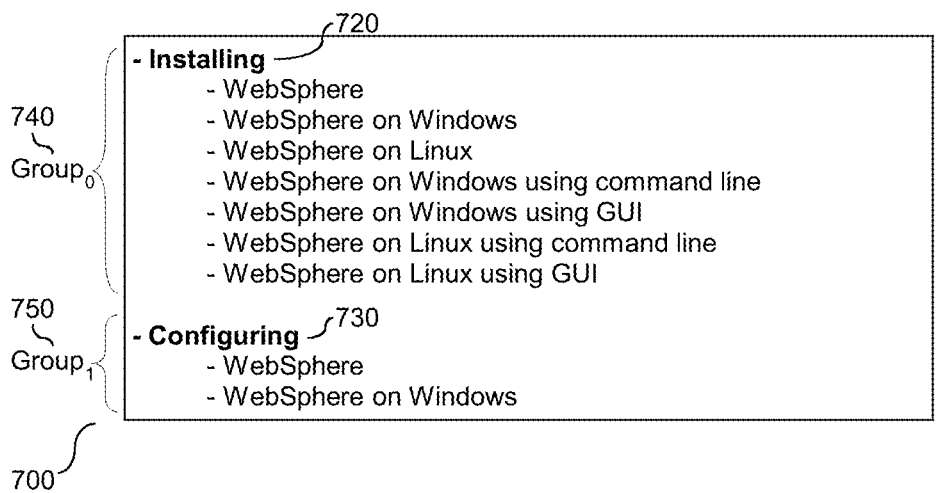
FIG. 7 depicts a block diagram illustrating an example of groupings of nouns with similar gerunds.

Referring to FIG. 5, a flow chart (500) is provided to illustrate the intent identification process utilizing a table of contents for a specified document. A document is identified or otherwise specified (502), and the table of contents (TOC) for the specified document is also identified (504). The primary verb, primary noun, second noun, etc., are each identified from the titles in the TOC (506). Referring to FIG. 6, a block diagram (600) is provided to illustrate an example TOC with tokenization of gerunds. The primary noun (610) shown in this example is "Websphere". Two primary verbs are shown in this example, including "Installing" (620) and "Configuring" (630). In one embodiment, for each title in the TOC, the noun(s) are classified based on their proximity to the verb. Following step (506) and incorporating the example shown in FIG. 6, topics within the TOC with similar verbs are grouped (508). More specifically, nouns with similar gerunds are placed into groups. Referring to FIG. 7, a block diagram (700) is provided to illustrate an example of groupings of nouns with similar gerunds. As shown, there are two groups, including a first group shown herein as group$_0$ (740) and a second group shown herein as group$_1$ (750). In this example, the gerund of group$_0$ (740) is "Installing" (720) and the gerund of group$_1$ (750) is "Configuring" (730). Accordingly, the TOC is leveraged and groupings therein are created based on common gerunds.

Following step (508) and leveraging the formed groupings of gerunds, a topic with one primary noun is created as a root (510). As shown in FIG. 4, nouns in the TOC were previously identified and categorized based on their physical proximity to a corresponding gerund. In one embodiment, the primary noun is assigned to a position in a hierarchy under construction as a primary node. Using the gerund for the topic being processed, the corresponding verb is identified and the TOC is searched to identify presence of different forms of the same verb (512). In one embodiment, and as shown herein with a phantom line, a dictionary or collection of verbs is leveraged to identify different forms of the same verb (514). Using the identified forms of the verb, one or more intent(s) is produced to define and capture the different forms of the verb (516). It is understood that a plurality of topics may be present in the document, and the process shown and described herein may be applied to each of the identified topics. Accordingly, as each topic is processed a corresponding intent is identified.

Figure 8:
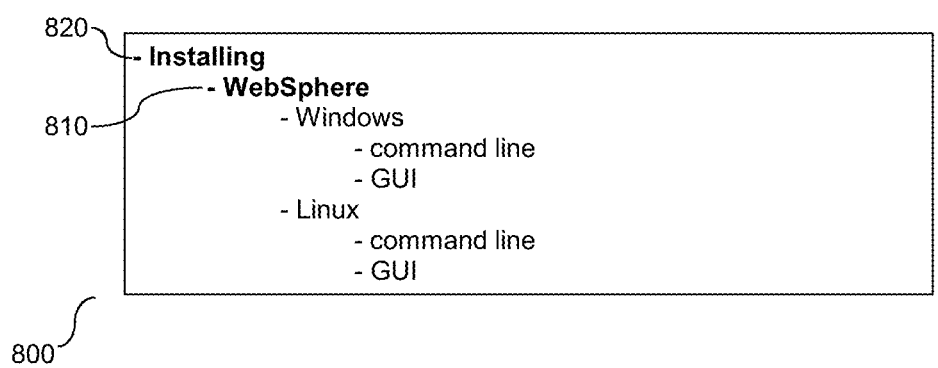
FIG. 8 depicts a block diagram illustrating an example set of groupings created with a noun as the root.

Referring to FIG. 8, a block diagram (800) is provided to illustrate an example set of groupings created with a noun as the root. As shown, the intent is identified as "Installing" (820), and the primary nouns designated as the root is "Websphere" (810). Accordingly, the grouping shown herein is the initial stage of creation of a dialog tree.

Figure 9:
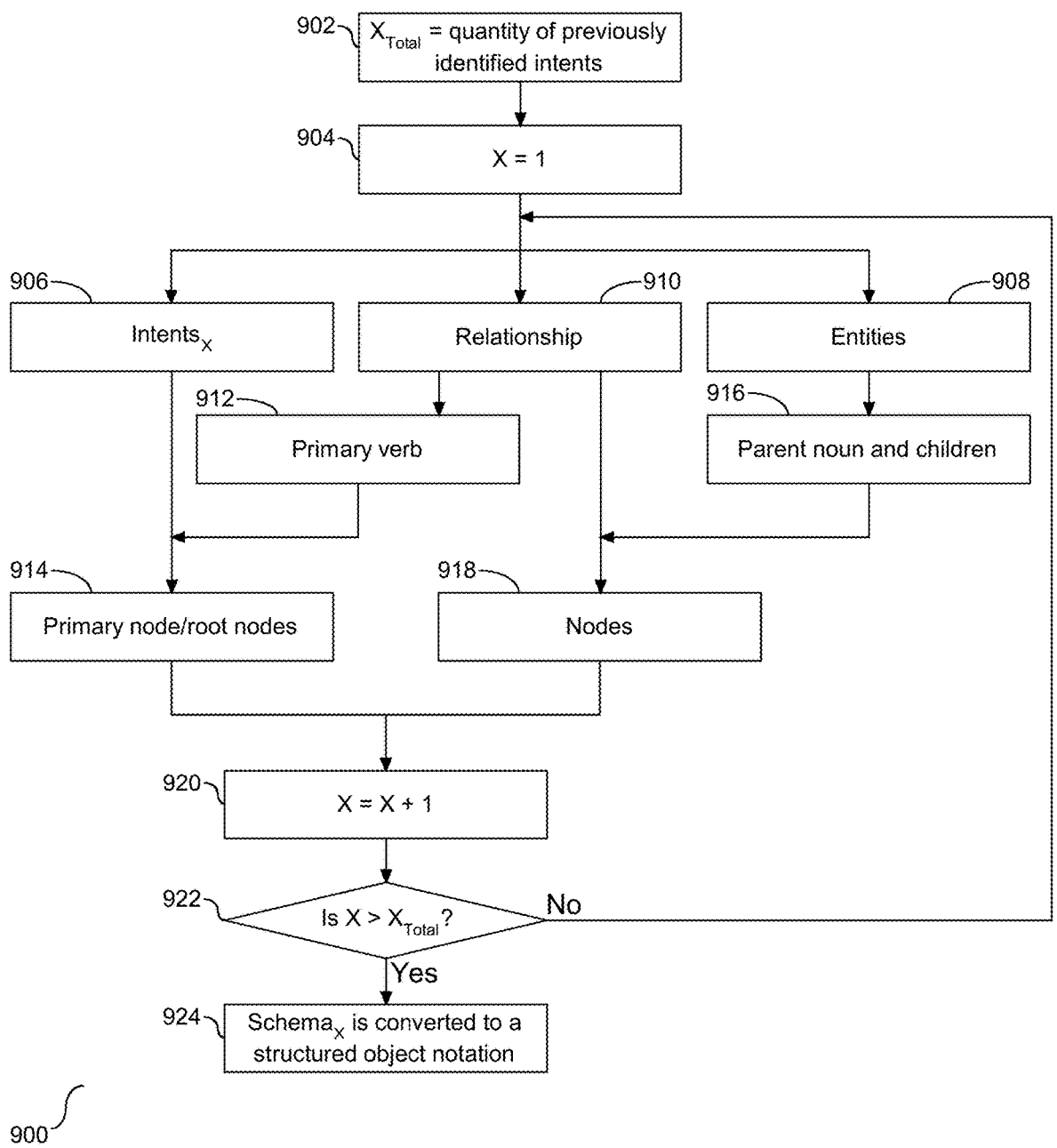
FIG. 9 depicts a flow chart illustrating a process for leveraging the intents produced in FIG. 5 to construct a topology of dialog nodes for translation into an AI schema format.

Referring to FIG. 9, a flow chart (900) is provided to illustrate a process for leveraging the intents produced in FIG. 5 to construct a topology of dialog nodes for translation into an AI schema format. The processes shown and described in FIGS. 3-8 are leveraged to construct the topology. The variable $X_{Total}$ represents a quantity of previously identified intents in the TOC (902), and a corresponding intent counting variable, X, is initialized (904). For each intent$_x$, (906), associated entities, e.g. nouns, are identified (908) and a corresponding relationship between the intent$_x$ and the identified entities is established (910). A primary verb is identified or extrapolated from the relationship (912), and the intent, e.g. intent$_x$, together with the primary verb is designated at a primary or root node (914). The identified entities associated with the intent, e.g. intent$_x$, and previously categorized as primary nouns, secondary nouns, tertiary nouns, etc. are organized, with the primary noun(s) designated as a parent noun(s), and the secondary noun(s) designated as a child noun(s), etc. (916). The organized nouns are translated into nodes, and structurally organized into a schema, e.g. AI schema, responsive to their corresponding designation (918). Accordingly, a primary node is created from the intents, and secondary node(s) are generated from the topology of nouns.

Following steps (914) and (918), the intent counting variable, X, is incremented (920), and it is determined if each of the intents have been processed (922). A negative response to the determination at step (922) is followed by a return to step (906), and a positive response concludes the construction of the dialog nodes. Each AI schema, from X=1 to $X_{Total}$, is converted to a structured object notation (924), e.g. javascript object notation (JSON) format. At such time as a chatbot is deployed and a communication is detected, an intent is detected from the chatbot platform, and the dialog nodes may be leveraged to facilitate and enable communication in the platform. Accordingly, a series of topological structures representing documents are constructed and converted to a structured object notation for use to enable and facilitate communication in a chatbot platform.

Figure 10:
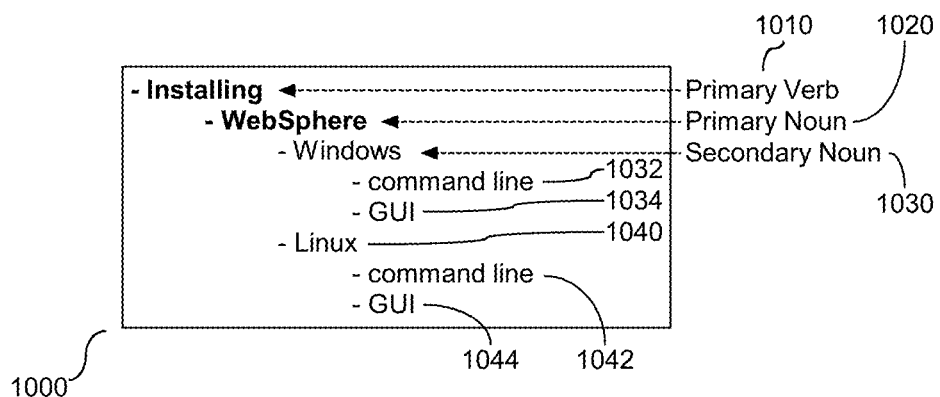
FIG. 10 depicts a block diagram illustrating a topology of gerunds, parent nouns and child nouns.

Referring to FIG. 10, a block diagram (1000) is provided to illustrate a topology of gerunds, parent nouns, and child nouns. As shown herein, the gerund, also referred to herein as a primary verb, is represented as "installing" (1010), and the primary noun is represented as "Websphere" (1020). Two secondary nouns are identified and associated with the primary noun, including "Windows" (1030) and "Linux" (1040). In addition, a set of tertiary nouns are identified and associated with each secondary noun. More specifically, secondary noun (1030) is shown with tertiary nouns (1032) and (1034), and secondary noun (1040) is shown with tertiary nouns (1042) and (1044). Accordingly, the topology depicts noun parents and their noun children for a corresponding gerund.

A dialog is a branching conversation flow that defines responses when defined intents and entities are recognized. The topology created in FIG. 9 represents dialog nodes, and more specifically an AI schema. Referring to FIG. 11, a block diagram (1100) is provided to illustrate an example dialog in a hierarchical tree structure arrangement. As shown, the intent is combined with a primary verb and designated as a root node (1110). The primary noun is designated as a parent node (1120) and attached to the root node (1110). Two child nodes (1130) and (1132) were previously identified. Each child node (1130) and (1132) is separately attached to the parent node (1120). In addition, four grandchild nodes were previously identified. In this example, two of the grandchild nodes (1140) and (1142) are related to child node (1130), and as such are attached to the child node (1130). Similarly, two of the grandchild nodes (1144) and (1146) are related to child node (1132), and as such are attached to child node (1132). Accordingly, the topology shown herein is constructed from the processes shown and described in FIGS. 3-10, and represents an AI dialog schema for a represented document.

Figure 12:
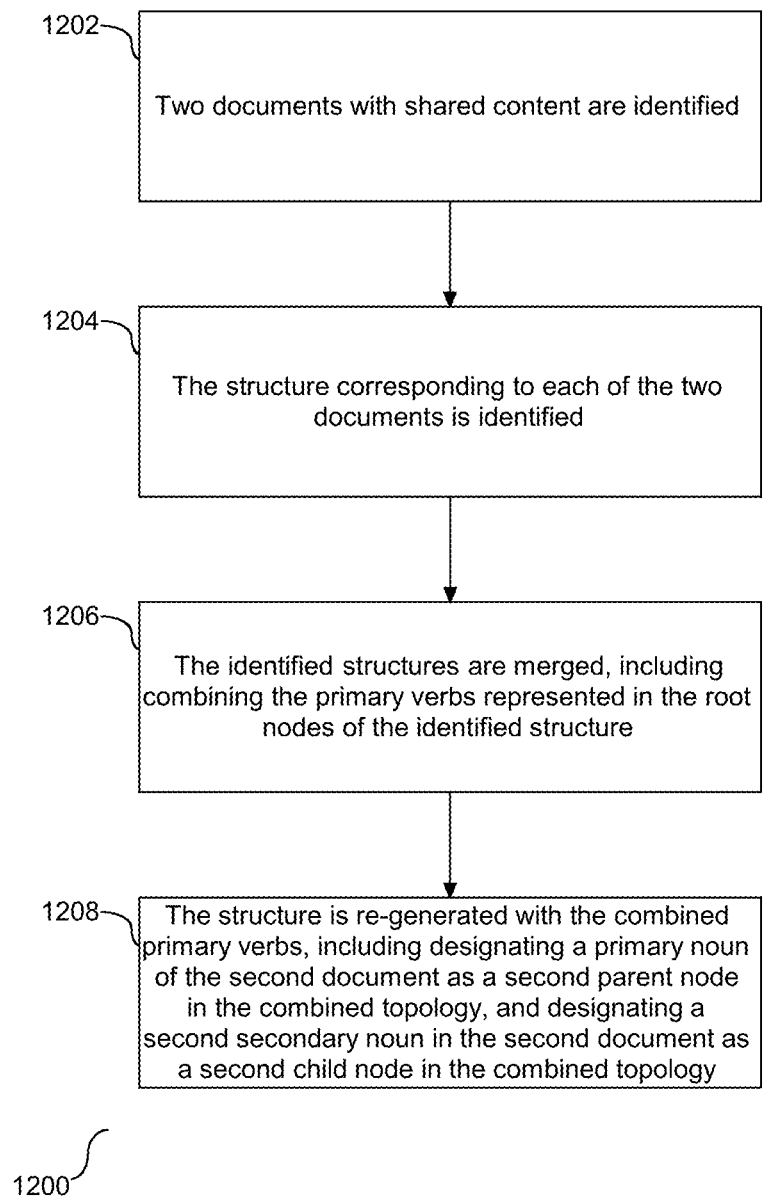
FIG. 12 depicts a flow chart illustrating a process for merging topological structures.

As shown and described in FIG. 1, two or more topological structures representing corresponding documents may be merged into a combined structure. Referring to FIG. 12, a flow chart (1200) is provided to illustrate a process for merging the document structures, and as shown and described in FIG. 1. It is understood in the art that documents organized into the same library may share content. In one embodiment, the shared content may be over-lapping or non-over-lapping. The example shown and described herein is directed to merging two documents, although in one embodiment the process may be expanded to accommodate additional documents in the merge process. Two documents with shared content are identified (1202). In one embodiment, the two documents may be in the same library in the knowledge base (170), although this embodiment is not limiting. As shown and described in FIG. 1, a topological structure is created to represent each document. The structure corresponding to each of the two documents is identified (1204). Thereafter, the identified structures are merged (1206), which includes combining the primary verbs represented in the root nodes of the identified structure. Following the merge of the root nodes, the structure is re-generated with the combined primary verbs (1208). The re-generation of the structure at step (1208) includes designating a primary noun of the second document as a second parent node in the combined topology, and designating a second secondary noun in the second document as a second child node in the combined topology. Accordingly, two or more documents may be merged, with the merge reflected in a re-generated combined topological structure.

Figure 13:
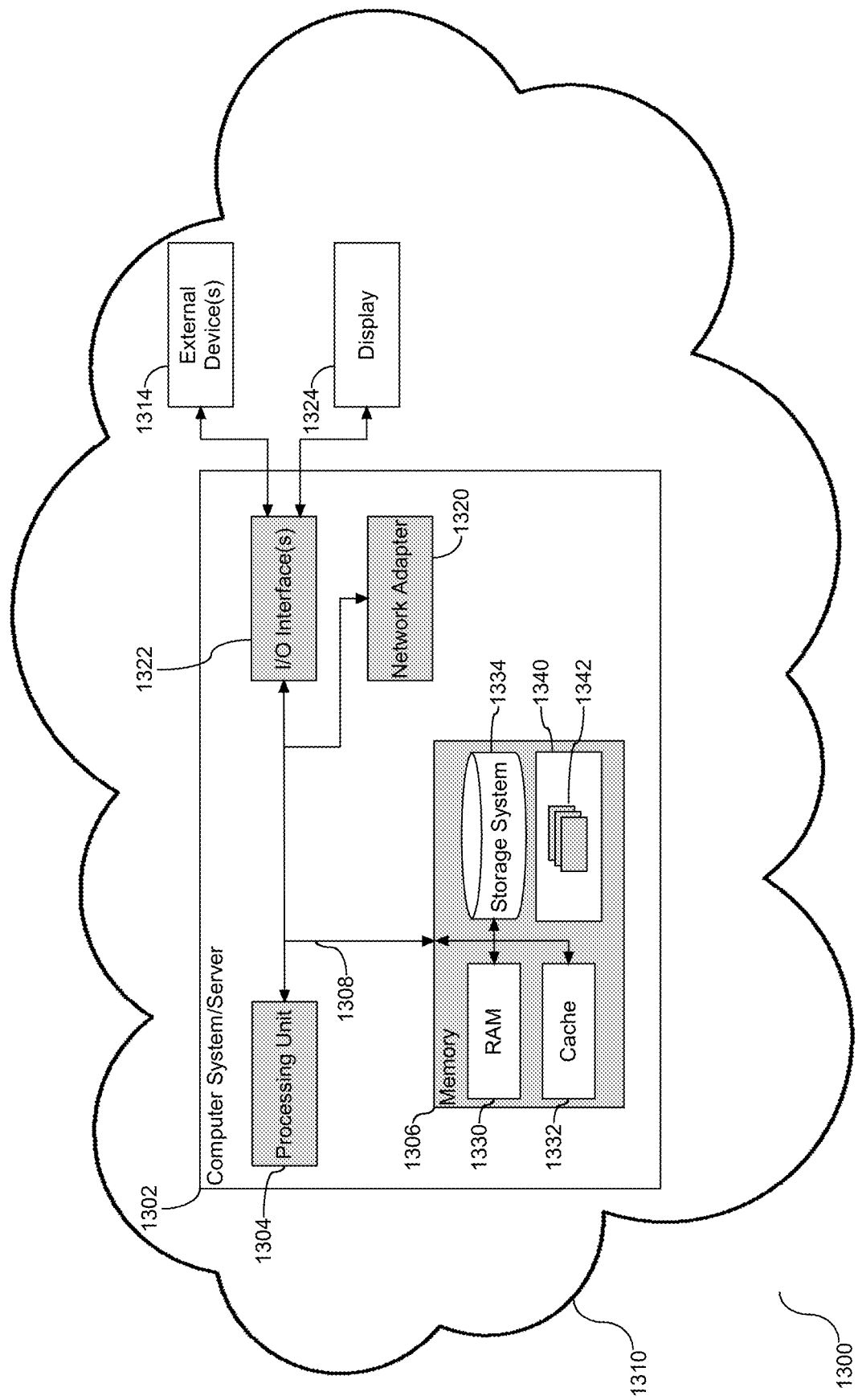
FIG. 13 depicts a block diagram illustrating an example of a computer system/server of a cloud based support system, to implement the system and processes described above with respect to FIGS. 1-12.

The embodiments shown and described herein may be in the form of a computer system for use with an intelligent computer platform for support communications in a chatbot platform. The embodiments and their associated functionality may be embodied in a computer system/server in a single location, or in one embodiment, may be configured in a cloud based system sharing computing resources. With references to FIG. 13, a block diagram (1300) is provided illustrating an example of a computer system/server (1302), hereinafter referred to as a host (1302) in a cloud computing environment (1310), to implement the system, tools, and processes described above with respect to FIGS. 1-12. Host (1302) is operational with numerous other general purpose or special purpose computing system environments or configurations. Examples of well-known computing systems, environments, and/or configurations that may be suitable for use with host (1302) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1302) may be described in the general context of computer system-executable instructions, such as program modules, being executed by a computer system. Generally, program modules may include routines, programs, objects, components, logic, data structures, and so on that perform particular tasks or implement particular abstract data types. Host (1302) may be practiced in distributed cloud computing environments where tasks are performed by remote processing devices that are linked through a communications network. In a distributed cloud computing environment, program modules may be located in both local and remote computer system storage media including memory storage devices.

Host (1302) is shown in the form of a general-purpose computing device. The components of host (1302) may include, but are not limited to, one or more processors or processing units (1304), e.g. hardware processors, a system memory (1306), and a bus (1308) that couples various system components including system memory (1306) to processor (1304). Bus (1308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1302) typically includes a variety of computer system readable media. Such media may be any available media that is accessible by host (1302) and it includes both volatile and non-volatile media, removable and non-removable media.

Memory (1306) can include computer system readable media in the form of volatile memory, such as random access memory (RAM) (1330) and/or cache memory (1332). By way of example only, storage system (1334) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1308) by one or more data media interfaces.

Program/utility (1340), having a set (at least one) of program modules (1342), may be stored in memory (1306) by way of example, and not limitation, as well as an operating system, one or more application programs, other program modules, and program data. Each of the operating systems, one or more application programs, other program modules, and program data or some combination thereof, may include an implementation of a networking environment. Program modules (1342) generally carry out the functions and/or methodologies of embodiments to create and manage the topological structures representing corresponding documents, and leveraging the structure(s) in the chatbot platform to support and enable communications therein. For example, the set of program modules (1342) may include the tools (152)-(158) as shown and described in FIG. 1.

Host (1302) may also communicate with one or more external devices (1314), such as a keyboard, a pointing device, etc.; a display (1324); one or more devices that enable a user to interact with host (1302); and/or any devices (e.g., network card, modem, etc.) that enable host (1302) to communicate with one or more other computing devices. Such communication can occur via Input/Output (I/O) interface(s) (1322). Still yet, host (1302) can communicate with one or more networks such as a local area network (LAN), a general wide area network (WAN), and/or a public network (e.g., the Internet) via network adapter (1320). As depicted, network adapter (1320) communicates with the other components of host (1302) via bus (1308). In one embodiment, a plurality of nodes of a distributed file system (not shown) is in communication with the host (1302) via the I/O interface (1322) or via the network adapter (1320). It should be understood that although not shown, other hardware and/or software components could be used in conjunction with host (1302). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1306), including RAM (1330), cache (1332), and storage system (1334), such as a removable storage drive and a hard disk installed in a hard disk drive.

Computer programs (also called computer control logic) are stored in memory (1306). Computer programs may also be received via a communication interface, such as network adapter (1320). Such computer programs, when run, enable the computer system to perform the features of the present embodiments as discussed herein. In particular, the computer programs, when run, enable the processing unit (1304) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (1302) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
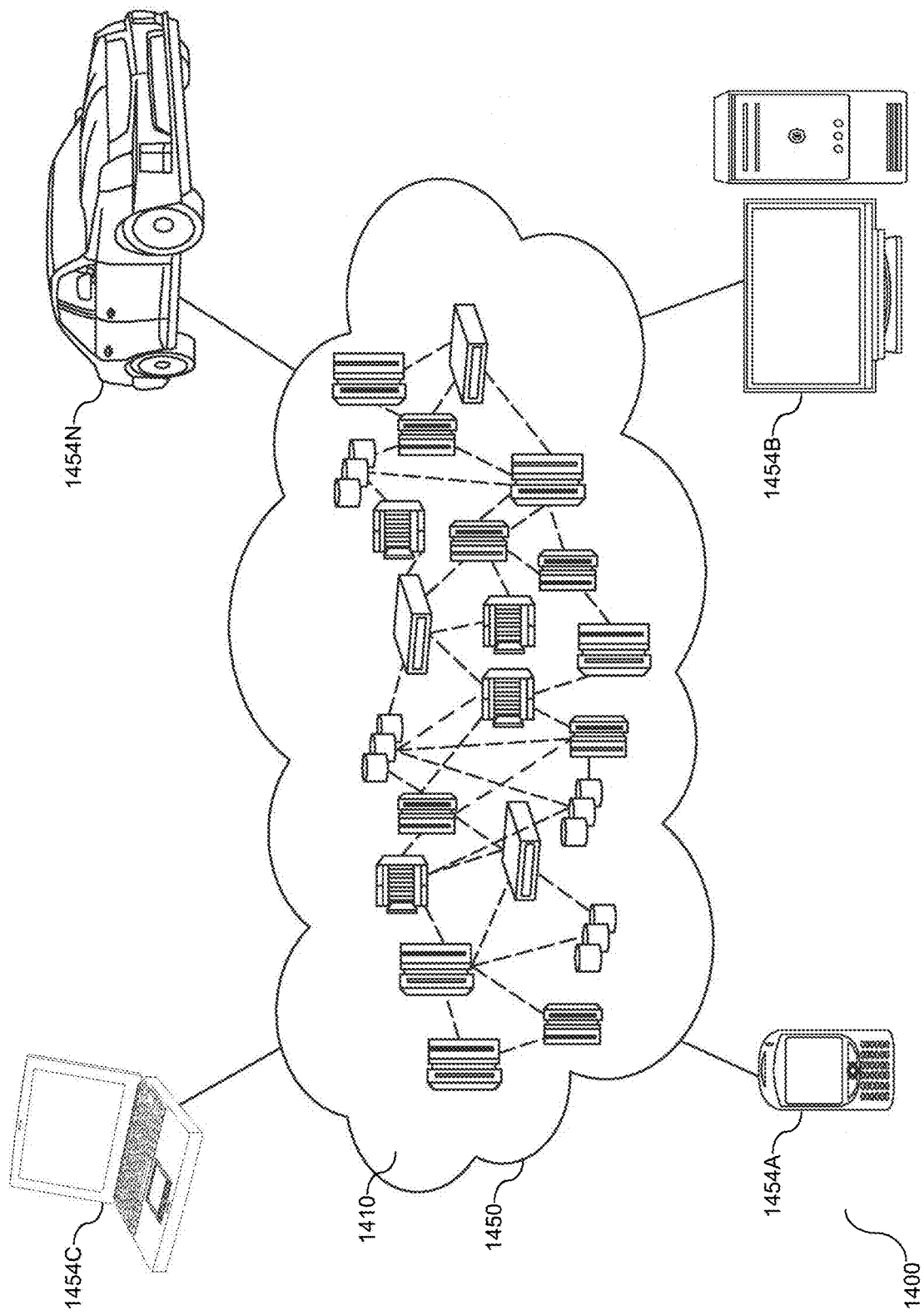
FIG. 14 depicts a block diagram illustrating a cloud computer environment.

Referring now to FIG. 14, an illustrative cloud computing network (1400). As shown, cloud computing network (1400)

includes a cloud computing environment (1450) having one or more cloud computing nodes (1410) with which local computing devices used by cloud consumers may communicate. Examples of these local computing devices include, but are not limited to, personal digital assistant (PDA) or cellular telephone (1454A), desktop computer (1454B), laptop computer (1454C), and/or automobile computer system (1454N). Individual nodes within nodes (1410) may further communicate with one another. They may be grouped (not shown) physically or virtually, in one or more networks, such as Private, Community, Public, or Hybrid clouds as described hereinabove, or a combination thereof. This allows cloud computing environment (1400) to offer infrastructure, platforms and/or software as services for which a cloud consumer does not need to maintain resources on a local computing device. It is understood that the types of computing devices (1454A-N) shown in FIG. 14 are intended to be illustrative only and that the cloud computing environment (1450) can communicate with any type of computerized device over any type of network and/or network addressable connection (e.g., using a web browser).

Figure 15:
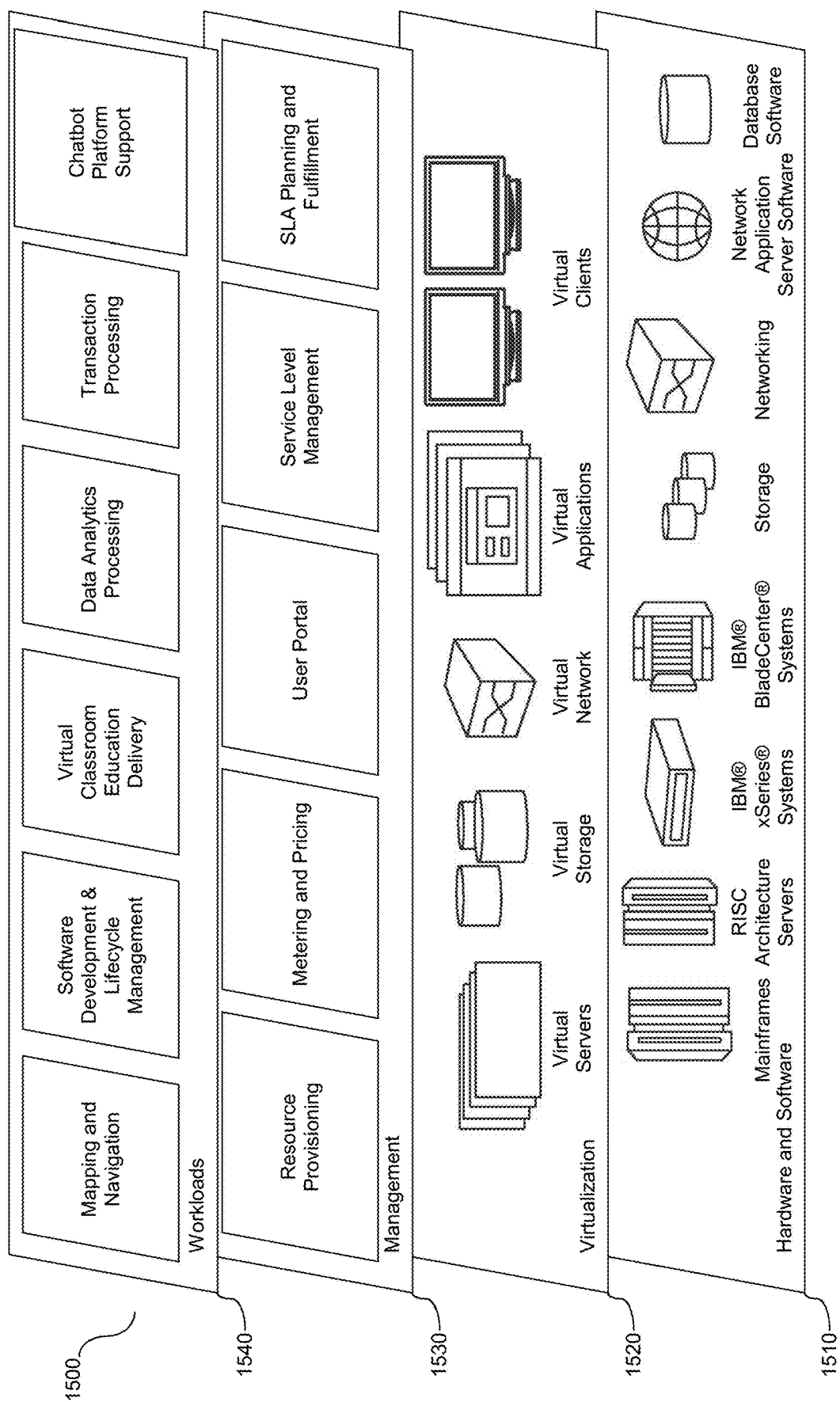
FIG. 15 depicts a block diagram illustrating a set of functional abstraction model layers provided by the cloud computing environment.

Referring now to FIG. 15, a set of functional abstraction layers (1500) provided by the cloud computing network of FIG. 14 is shown. It should be understood in advance that the components, layers, and functions shown in FIG. 15 are intended to be illustrative only, and the embodiments are not limited thereto. As depicted, the following layers and corresponding functions are provided: hardware and software layer (1510), virtualization layer (1520), management layer (1530), and workload layer (1540).

The hardware and software layer (1510) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1520) provides an abstraction layer from which the following examples of virtual entities may be provided: virtual servers; virtual storage; virtual networks, including virtual private networks; virtual applications and operating systems; and virtual clients.

In one example, management layer (1530) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1540) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and chatbot platform support.

It will be appreciated that there is disclosed herein a system, method, and computer program product for leveraging generated AI schema representing a conversation flow for use in a chatbot platform.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, method, and/or a computer program product are operative to improve the functionality and operation of an artificial intelligence platform for dynamic generation of an AI.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processing unit operatively coupled to memory;
   an artificial intelligence (AI) platform in communication with the processing unit, the AI platform to support a chatbot platform, the AI platform comprising:
      a natural language (NL) manager to subject two or more semantically enriched documents to natural language processing (NLP) and generate a cache of identified tokens for each semantically enriched document;
      the NL manager to classify tokens in each of the generated caches, including noun tokens and verb tokens, and for each verb token, generate an intent corresponding to the verb token, and for each noun token, generate an entity corresponding to the noun token;
      a relationship manager to map a relationship between the generated intents and entities;
      a topology manager to construct a topology for each semantically enriched document representing the mapped relationship, including identify a primary verb and assign the primary verb as a root node in the topology, identify a first primary noun and assign the first primary noun as a first parent node positioned adjacent to the root node in the topology, and identify first arrangement of entities related to the primary verb and the first primary noun and assign the first arrangement of entities as one or more first child nodes positioned adjacent to the first parent node in the topology;
      the relationship manager to selectively merge the two or more constructed topologies into a combined topological structure including combining the primary verb represented in each constructed topology; and
      the topology manager to re-generate the combined topological structure with the combined primary verbs including identify a second primary noun and assign the second primary noun to a second parent node in the combined topological structure, and identify a second arrangement of entities and assign the second arrangement of entities as second child nodes in the combined topological structure; and
   the processing unit to consume the combined topological structure to an artificial intelligence (AI) schema for implementation in the chatbot platform to support real-time communication flow.

2. The computer system of claim 1, wherein the re-generated combined topological structure represents a dialog, and further comprising an artificial intelligence (AI) manager to leverage the re-generated combined topological structure and dialog to represent a series of communications, with hierarchical relationships defined in the topology representing branches of the communication flow.

3. The computer system product of claim 2, further comprising the AI manager to detect deployment of a chatbot and a communication topic from an inquiry presented in the deployed chatbot, select an AI schema commensurate with the chatbot communication topic, and leverage the selected AI schema to support communications in the chatbot.

4. The computer system product of claim 3, further comprising the AI manager to leverage the selected AI schema and generate a communication in the deployed chatbot corresponding to the communication topic.

5. The computer system product of claim 4, further comprising the AI manager to generate one or more reply communications in the chatbot from context represented in the selected AI schema.

6. A computer program product for supporting a chatbot platform, the computer program product comprising a computer readable storage medium having program code embodied therewith, the program code executable by a processor to:
   subject two or more semantically enriched documents to natural language processing (NLP) and generate a cache of identified tokens for each semantically enriched document;
   classify tokens in each of the generated caches, including noun tokens and verb tokens;
   for each verb token, generate an intent corresponding to the verb token, and for each noun token, generate an entity corresponding to the noun token;

map a relationship between the generated intents and entities;

construct a topology for each semantically enriched document representing the mapped relationship, including identify a primary verb and assign the primary verb as a root node in the topology, identify a first primary noun and assign the first primary noun as a first parent node positioned adjacent to the root node in the topology, and identify first arrangement of entities related to the primary verb and the first primary noun and assign the first arrangement of entities as one or more first child nodes positioned adjacent to the first parent node in the topology;

selectively merge the two or more constructed topologies into a combined topological structure including combining the primary verb represented in each constructed topology;

re-generate the combined topological structure with the combined primary verbs including identify a second primary noun and assign the second primary noun to a second parent node in the combined topological structure, and identify a second arrangement of entities and assign the second arrangement of entities as second child nodes in the combined topological structure; and consume the re-generated combined topological structure to an artificial intelligence (AI) schema for implementation in the chatbot platform to support real-time communication flow.

7. The computer program product of claim 6, further comprising program code to leverage the re-generated combined topological structure to represent a series of communications, with hierarchical relationships defined in the re-generated combined topological structure representing branches of the communication flow.

8. The computer program product of claim 7, further comprising program code to detect deployment of a chatbot and a communication topic from an inquiry presented in the deployed chatbot, select an AI schema commensurate with the chatbot communication topic, and leverage the selected AI schema to support communications in the chatbot.

9. The computer program product of claim 8, wherein the program code to leverage the selected AI schema includes program code to generate a communication in the deployed chatbot corresponding to the communication topic.

10. The computer program product of claim 9, further comprising program code to generate one or more reply communications in the chatbot from context represented in the selected AI schema.

11. A method comprising:

subjecting two or more semantically enriched documents to natural language processing (NLP) and generating a cache of identified tokens for each semantically enriched document;

classifying tokens in each of the generated caches, including noun tokens and verb tokens;

for each verb token, generating an intent corresponding to the verb token, and for each noun token, generating an entity corresponding to the noun token;

mapping a relationship between the generated intents and entities;

constructing a topology for each semantically enriched document representing the mapped relationship, including identifying a primary verb and assigning the primary verb as a root node in the topology, identifying a first primary noun and assigning the first primary noun as a first parent node positioned adjacent to the root node in the topology, and identifying first arrangement of entities related to the primary verb and the first primary noun and assigning the first arrangement of entities as one or more first child nodes positioned adjacent to the parent node in the topology;

selectively merging the two or more constructed topologies into a combined topological structure including combining the primary verb represented in each constructed topology; and re-generating the combined topological structure with the combined primary verbs including identify a second primary noun and assign the second primary noun to a second parent node in the combined topological structure, and identify a second arrangement of entities and assign the second arrangement of entities as second child nodes in the combined topological structure; and consuming the re-generated combined topological structure to an artificial intelligence (AI) schema for implementation in a chatbot platform to support real-time communication flow.

12. The method of claim 11, further comprising leveraging the re-generated combined topological structure to represent a series of communications, with hierarchical relationships defined in the re-generated combined topological structure representing branches of the communication flow.

13. The method of claim 12, further comprising detecting deployment of a chatbot and a communication topic from an inquiry presented in the deployed chatbot, selecting an AI schema commensurate with the chatbot communication topic, and leveraging the selected AI schema to support communications in the chatbot.

14. The method of claim 13, wherein leveraging the selected AI schema includes generating a communication in the deployed chatbot corresponding to the communication topic.

15. The method of claim 14, further comprising generating one or more reply communications in the chatbot from context represented in the selected AI schema.

* * * * *